(12) United States Patent
Esteves et al.

(10) Patent No.: US 8,498,308 B2
(45) Date of Patent: *Jul. 30, 2013

(54) METHOD AND APPARATUS FOR FAST CLOSED-LOOP RATE ADAPTATION IN A HIGH RATE PACKET DATA TRANSMISSION

(75) Inventors: Eduardo A. S. Esteves, San Diego, CA (US); Rashid A. Attar, San Diego, CA (US); Nagabhushana T. Sindhushayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1150 days.

This patent is subject to a terminal disclaimer.

(21) Appl. No.: 11/592,568

(22) Filed: Nov. 3, 2006

(65) Prior Publication Data

US 2007/0064646 A1    Mar. 22, 2007

Related U.S. Application Data

(63) Continuation of application No. 09/570,210, filed on May 12, 2000, now Pat. No. 7,245,594.

(51) Int. Cl.
*H04W 28/04* (2009.01)

(52) U.S. Cl.
CPC .................................... *H04W 28/04* (2013.01)
USPC .......................................................... 370/442

(58) Field of Classification Search
USPC .............. 370/230.1, 232, 243, 252, 253, 322, 370/335, 337, 340, 348, 347, 352, 395.2, 370/412, 442, 450, 451, 452, 454, 458, 459, 370/468, 524; 375/133, 222, 225, 227; 455/62, 455/67.11, 67.13, 69, 436, 450, 452.2, 502, 509, 519; 340/825.25
See application file for complete search history.

(56) References Cited

U.S. PATENT DOCUMENTS

| 3,644,678 | A | 2/1972 | Schmidt ......................... 370/322 |
| 4,482,999 | A | 11/1984 | Janson et al. .................. 370/452 |
| 4,742,512 | A | 5/1988 | Akashi et al. .................. 370/347 |
| 4,868,866 | A | 9/1989 | Williams et al. |
| 4,901,307 | A | 2/1990 | Gilhousen |
| 5,038,399 | A | 8/1991 | Bruckert ..................... 455/67.11 |

(Continued)

FOREIGN PATENT DOCUMENTS

| EP | 0652680 A2 | 5/1995 |
| EP | 0876008 | 11/1998 |

(Continued)

OTHER PUBLICATIONS

International Search Report—PCT/US01/015381, International Search Authority—European Patent Office, Jul. 24, 2002.

(Continued)

*Primary Examiner* — Ricky Ngo
*Assistant Examiner* — Phuongchau B Nguyen
(74) *Attorney, Agent, or Firm* — Kristine U. Ekwueme; Michael J. DeHaemer, Jr.

(57) ABSTRACT

In a high data rate communication system capable of variable rate transmission, an open loop rate control can be adjusted with a closed loop rate control to maximize throughput. An access point generates interleaved multi-slot packets that allow an access terminal to transmit indicator messages to the access point in accordance with recently received data carried within slots of the multi-slot packets.

30 Claims, 4 Drawing Sheets

U.S. PATENT DOCUMENTS

| | | | |
|---|---|---|---|
| 5,103,459 A | 4/1992 | Gilhousen | |
| 5,128,965 A | 7/1992 | Henriksson | 455/452.2 |
| 5,172,375 A | 12/1992 | Kou | 370/322 |
| 5,203,008 A | 4/1993 | Yasuda et al. | 455/452.2 |
| 5,227,775 A | 7/1993 | Bruckert et al. | 340/825.25 |
| 5,287,544 A | 2/1994 | Menich et al. | 455/436 |
| 5,295,140 A | 3/1994 | Crisler | 370/458 |
| 5,303,234 A | 4/1994 | Kou | 370/459 |
| 5,377,192 A | 12/1994 | Goodings | 370/348 |
| 5,396,516 A | 3/1995 | Padovani et al. | |
| 5,483,676 A | 1/1996 | Mahany et al. | 370/468 |
| 5,504,773 A | 4/1996 | Padovani et al. | |
| 5,790,533 A | 8/1998 | Burke et al. | 370/318 |
| 5,881,061 A | 3/1999 | Iizuke et al. | 370/337 |
| 5,933,462 A | 8/1999 | Viterbi | |
| 5,946,320 A * | 8/1999 | Decker | 370/428 |
| 6,005,856 A | 12/1999 | Jensen et al. | 370/337 |
| 6,034,952 A | 3/2000 | Dohi et al. | 370/252 |
| 6,088,337 A | 7/2000 | Eastmond et al. | 370/280 |
| 6,154,450 A | 11/2000 | Wallentin et al. | 370/311 |
| 6,192,029 B1 | 2/2001 | Averbuch et al. | 370/230 |
| 6,219,528 B1 | 4/2001 | Wright et al. | 455/13.4 |
| 6,275,488 B1 * | 8/2001 | Cudak et al. | 370/347 |
| 6,285,655 B1 | 9/2001 | Lundby | |
| 6,400,701 B2 | 6/2002 | Lin et al. | 455/450 |
| 6,426,971 B1 * | 7/2002 | Wu et al. | 375/227 |
| 6,459,901 B1 | 10/2002 | Chawla et al. | 455/67.13 |
| 6,487,181 B1 * | 11/2002 | Johnson et al. | 370/458 |
| 6,501,785 B1 | 12/2002 | Chang et al. | 375/133 |
| 6,539,033 B1 | 3/2003 | Kamperschroer et al. | 455/450 |
| 6,574,211 B2 | 6/2003 | Padovani et al. | 370/347 |
| 6,584,116 B1 | 6/2003 | Gourgue et al. | 370/442 |
| 6,587,443 B1 | 7/2003 | Dutta | 370/322 |
| 6,603,797 B1 * | 8/2003 | Zeira et al. | 375/130 |
| 6,608,821 B1 | 8/2003 | Gendel | 370/468 |
| 6,661,774 B1 | 12/2003 | Lauffenburger | 370/395.2 |
| 6,704,898 B1 * | 3/2004 | Furuskar et al. | 714/751 |
| 6,901,395 B2 | 5/2005 | Andrus et al. | |
| 6,975,611 B1 * | 12/2005 | Balachandran et al. | 370/337 |
| 7,051,268 B1 * | 5/2006 | Sindhushayana et al. | 375/262 |
| 7,088,701 B1 * | 8/2006 | Attar et al. | 370/347 |
| 7,245,594 B1 * | 7/2007 | Esteves et al. | 370/322 |
| 7,417,957 B2 * | 8/2008 | Sindhushayana et al. | 370/252 |
| 2001/0056560 A1 * | 12/2001 | Khan et al. | 714/746 |
| 2002/0198012 A1 | 12/2002 | Vukovic et al. | |
| 2003/0185181 A1 * | 10/2003 | Balachandran et al. | 370/337 |
| 2004/0056560 A1 | 3/2004 | Wang et al. | |
| 2007/0263655 A1 * | 11/2007 | Esteves et al. | 370/460 |

FOREIGN PATENT DOCUMENTS

| | | |
|---|---|---|
| RU | 2142197 C1 | 11/1999 |
| WO | WO 97/25827 | 7/1997 |
| WO | WO 98/37713 | 8/1998 |
| WO | WO 99/22481 | 5/1999 |
| WO | WO 99/60740 | 11/1999 |
| WO | WO 99/60742 | 11/1999 |
| WO | WO 9956420 | 11/1999 |
| WO | WO 0025469 | 5/2000 |
| WO | WO 00/76233 A1 | 12/2000 |

OTHER PUBLICATIONS

European Search Report—EP06025215, Search Authority—The Hague—May 4, 2007.

European Search Report—EP06122876, Search Authority—Munich—Jan. 16, 2007.

European Search Report—EP09165436—European Search Authority—Munich—Aug. 6, 2009.

European Search Report—EP10174185, Search Authority—Munich Patent Office, Sep. 21, 2010.

European Search Report—EP10174191, Search Authority—Munich Patent Office, Sep. 21, 2010.

European Search Report—EP10174195—Search Authority—Munich—Sep. 21, 2010.

* cited by examiner

US 8,498,308 B2

METHOD AND APPARATUS FOR FAST CLOSED-LOOP RATE ADAPTATION IN A HIGH RATE PACKET DATA TRANSMISSION

CLAIM OF PRIORITY UNDER 35 U.S.C. §120

The present Application for patent is a Continuation and claims priority to patent application Ser. No. 09/570,210 entitled "METHOD AND APPARATUS FOR FAST CLOSED-LOOP RATE ADAPTATION IN A HIGH RATE PACKET DATA TRANSMISSION" filed May 12, 2000 now U.S. Pat. No. 7245594, and assigned to the assignee hereof and hereby expressly incorporated by reference herein.

BACKGROUND OF THE INVENTION

I. Field of the Invention

The present invention relates to data communication. More particularly, the present invention relates to a novel and improved method and apparatus for performing fast closed-loop rate adaptation in a high rate packet data transmission.

II. Description of the Related Art

Mobile computing and data access is steadily becoming available to an increasing number of users. The development and introduction of new data services and technologies that will provide continuous data connectivity and full access to information is presently occurring. Users can now use a variety of electronic devices to retrieve voice or data information stored on other electronic devices or data networks. Some of these electronic devices can connect to data resources through wires and some can connect to data resources through wireless solutions. As used herein, an access terminal is a device providing data connectivity to a user. An access terminal may be coupled to a computing device, such as a desktop computer, a laptop computer, or a personal data assistant (PDA), or it may be physically incorporated into any such devices. An access point is equipment that provides data connectivity between a packet switched data network and access terminals.

An example of an access terminal that can be used to provide wireless connectivity is a mobile telephone that is part of a communication system capable of supporting a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein. It should be understood that the present invention is equally applicable to other types of communication systems. Systems utilizing other well-known transmission modulation schemes such as TDMA and FDMA as well as other spread spectrum systems may employ the present invention.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the traffic data or voice data is partitioned into code channel frames which are 20 msec wide with data rates as high as 14.4 Kbps.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462 entitled "SOFT DECISION OUTPUT DECODER FOR DECODING CONVOLUTIONALLY ENCODED CODEWORDS," filed Nov. 6, 1996, assigned to the assignee of the present invention and incorporated by reference herein.

Another significant difference between voice services and data services is that the former requires a fixed and common grade of service (GoS) for all users. Typically, for digital systems providing voice services, this translates into a fixed and equal transmission rate for all users and a maximum tolerable value for the error rates of the speech frames. In contrast, for data services, the GoS can be different from user to user and can be a parameter optimized to increase the overall efficiency of the data communication system. The GoS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

The transmission delay required to transfer a data packet and the average throughput rate of a communication system are parameters that measure the quality and effectiveness of the data communication system. Transmission delay does not have the same impact in data communication as it does for voice communication, but it is an important metric for measuring the quality of the data communication system. The average throughput rate is a measure of the efficiency of the data transmission capability of the communication system.

It is well known that in cellular systems, the signal-to-interference-and-noise ratio (SINR) of any given user is a function of the location of the user within the coverage area. In order to maintain a given level of service, time division multiple access (TDMA) and frequency division multiple access (FDMA) systems resort to frequency reuse techniques, i.e. not all frequency channels and/or time slots are used in each base station. In a CDMA system, the same frequency allocation is reused in every cell of the system, thereby improving the overall efficiency. The SINR measured at any given user's mobile station determines the information rate that can be supported for this particular link from the base station to the user's mobile station. Given the specific modulation and error correction method used for the transmission, a given level of performance is achieved at a corresponding level of SINR. For an idealized cellular system with hexagonal cell layouts and utilizing a common frequency in every cell, the distribution of SINR achieved within the idealized cells can be calculated.

In a system that is capable of transmitting data at high rates, which will be referred to hereafter as a High Data Rate (HDR) system, an open-loop rate adaptation algorithm is used to adjust the data rate of the forward link. An exemplary HDR system is described in U.S. Pat. No. 6,574,211, entitled "METHOD AND APPARATUS FOR HIGH RATE PACKET DATA TRANSMISSION," assigned to the assignee of the present invention and incorporated herein by reference. The open-loop rate adaptation algorithm adjusts the data rate in accordance with the varying channel conditions typically found in a wireless environment. In general, an access terminal measures the received SINR during periods of pilot signal transmissions on the forward link. The access terminal uses the measured SINR information to predict the future average SINR over the next data packet duration. An exemplary prediction method is discussed in U.S. Pat. No. 6,426,971 entitled, "SYSTEM AND METHOD FOR ACCURATELY PREDICTING SIGNAL TO INTERFERENCE AND NOISE RATIO TO IMPROVE COMMUNICATIONS SYSTEM PERFORMANCE assigned to the assignee of the present invention and incorporated herein by reference. The predicted SINR determines the maximum data rate that can be supported on the forward link with a given probability of success. Hence, the open-loop rate adaptation algorithm is the mechanism by which the access terminal requests an access point to transmit the next packet at the data rate determined by the predicted SINR. The open-loop rate adaptation method has proven to be very effective in providing a high throughput packet data system even in adverse wireless channel conditions, such as a mobile environment.

However, the use of an open-loop rate adaptation method is impaired by the implicit feedback delay associated with the transmission of the rate request feedback to the access point. This implicit delay problem is exacerbated when channel conditions change rapidly, thus requiring the access terminal to update its requested data rate several times per second. In a typical HDR system, the access terminal would make approximately 600 updates per second.

Other reasons exist for not implementing a pure open-loop rate adaptation method. For example, the open-loop rate adaptation method is highly dependent upon the accuracy of the SINR estimate. Hence, imperfect SINR measurements would prevent the access terminal from making a precise characterization of the underlying channel statistics. One factor that would lead to imprecise channel statistics is the feedback delay discussed above. Due to the feedback delay, the access terminal must predict a supportable data rate in the near future using past and present noisy SINR estimates. Another factor that would lead to imprecise channel statistics is the unpredictable, bursty nature of received data packets. In a packet data cellular system, such bursts cause sudden changes in the interference levels seen at the access terminal. The unpredictability of the interference levels cannot be efficiently accounted for by a pure open-loop rate adaptation scheme.

Another reason for not implementing a pure open-loop rate adaptation method is an inability to minimize the effects of errors. For example, when the prediction error for an estimated SINR is large, as in the case of some mobile environments, the access terminal will transmit a conservative data rate request in order to ensure a low packet error probability. A low packet error probability will provide low overall delays in the transmission. However, it is probable that the access terminal could have successfully received a higher data rate packet. There is no mechanism in the open-loop rate adaptation method to update a data rate request based on estimated channel statistics with a data rate based on the actual channel statistics during the transmission of a data packet. Hence, the open-loop rate adaptation method would not provide a maximized throughput rate when the prediction error for an estimated SINR is large.

Another example in which the open-loop rate adaptation method fails to minimize the effects of an error is the instance when the access terminal has incorrectly decoded a received packet. The Radio Link Protocol (RLP) requires a retransmission request when the access terminal incorrectly decodes a packet, but the retransmission request is generated only after detecting a gap in the received sequence number space. Therefore, the RLP protocol requires the processing of a subsequent received packet after the incorrectly decoded packet. This procedure increases the overall transmission delay. Some mechanism is needed to implement a quick retransmission of some or all of the code symbols contained in the data packet, wherein the mechanism would enable the access terminal to correctly decode the packet without incurring excessive delays.

Hence, there exists a present need to modify the open-loop rate adaptation method in order to minimize transmission delays and to maximize the throughput rate as discussed above.

SUMMARY

The present invention is directed to a novel and improved method and apparatus for modifying an open-loop rate adaptation algorithm to produce a hybrid open loop/closed loop rate adaptation scheme. An access point advantageously generates a time interleaved structure for slots in data packets, allowing an access terminal to transmit indicator messages to the access point during periods associated with gaps inserted into the interleaved structure.

In one aspect of the invention, the periods associated with the interleaved gaps are of sufficient duration to allow the access terminal to decode the data carried in the slots and to send an indicator message based on the decoded data. In an alternative aspect of the invention, the indicator messages are based on an estimated signal-to-interference-and-noise level.

In another aspect of the invention, the indicator messages are one bit long, which is interpreted by the access point in accordance with the timing of the arrival of the bit.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
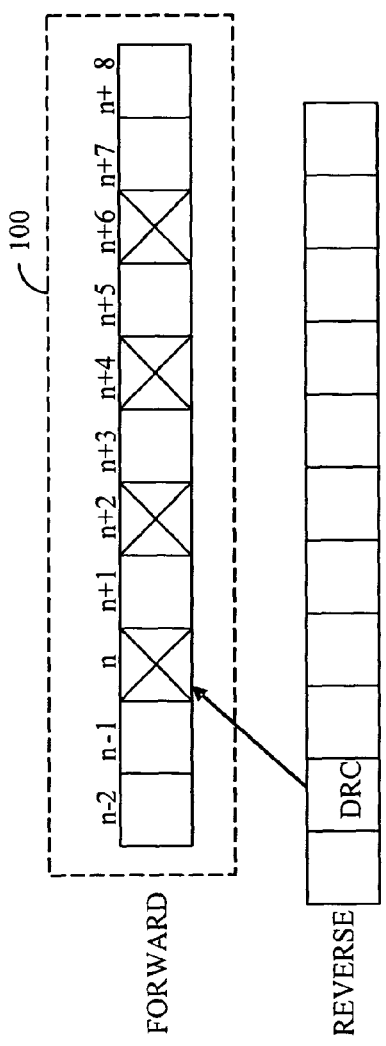
FIG. 1 is a diagram of an exemplary one-slot gap interlaced structure for multi-slot packets.

In an exemplary embodiment of a data communication system, forward link data transmission occurs from one access point to one or more access terminals at the data rate requested by the access terminal(s). Reverse link data communication can occur from one access terminal to one or more access points. Data is partitioned into data packets, with each data packet being transmitted over one or more time slots. At each time slot, the access point can direct data transmission to any access terminal in communication with the access point.

Initially, the access terminal establishes communication with an access point using a predetermined access procedure. In this connected state, the access terminal can receive data messages and control messages from the access point, and is able to transmit data messages and control messages to the access point. The access terminal then monitors the forward link for transmissions from the access points in the active set of the access terminal. The active set contains a list of access points in communication with the access terminal. Specifically, the access terminal measures the signal-to-interference-and-noise ratio (SINR) of the forward link pilot from the access points in the active set, as received at the access terminal. If the received pilot signal is above a predetermined add threshold or below a predetermined drop threshold, the access terminal reports this to the access point. Subsequent messages from the access point direct the access terminal to add or delete the access point to or from its active set, respectively.

If there is no data to send, the access terminal returns to an idle state and discontinues transmission of data rate information to the access point(s). While the access terminal is in the idle state, the access terminal periodically monitors the control channel from one or more access points in the active set for paging messages.

If there is data to be transmitted to the access terminal, the data is sent by a central controller to all access points in the active set and stored in a queue at each access point. A paging message is then sent by one or more access points to the access terminal on the respective control channels. The access point may transmit all such paging messages at the same time across several access points in order to ensure reception even when the access terminal is switching between access points. The access terminal demodulates and decodes the signals on one or more control channels to receive the paging messages.

Upon decoding the paging messages, and for each time slot until the data transmission is completed, the access terminal measures the SINR of the forward link signals from the access points in the active set, as received at the access terminal. The SINR of the forward link signals can be obtained by measuring the respective pilot signals. The access terminal then selects the best access point based on a set of parameters. The set of parameters can comprise the present and previous SINR measurements and the bit-error-rate or packet-error-rate. For example, the best access point can be selected based on the largest SINR measurement. The access terminal then identifies the best access point and transmits to the selected access point a data rate control message (hereinafter referred to as the DRC message) on the data rate control channel (hereinafter referred to as the DRC channel). The DRC message can contain the requested data rate, or alternatively, the quality of the forward link channel (e.g., the SINR measurement itself, the bit-error-rate, or the packet-error-rate). In the exemplary embodiment, the access terminal can direct the transmission of the DRC message to a specific access point by the use of a Walsh code that uniquely identifies the access point. The DRC message symbols are exclusively OR'ed (XOR) with the unique Walsh code. Since each access point in the active set of the access terminal is identified by a unique Walsh code, only the selected access point which performs the identical XOR operation as that performed by the access terminal, with the correct Walsh code, can correctly decode the DRC message. The access point uses the rate control information from each access terminal to efficiently transmit forward link data at the highest possible rate.

At each time slot, the access point can select any of the paged access terminals for data transmission. The access point then determines the data rate at which to transmit the data to the selected access terminal based on the most recent value of the DRC message received from the access terminal. Additionally, the access point uniquely identifies a transmission to a particular access terminal by appending an identifying preamble to a data packet directed to an access terminal. In the exemplary embodiment, the preamble is spread using a Walsh code that uniquely identifies the access terminal.

In the exemplary embodiment, the forward link capacity of the data transmission system is determined by the data rate requests of the access terminals. Additional gains in the forward link capacity can be achieved by using directional antennas and/or adaptive spatial filters. An exemplary method and apparatus for providing directional transmissions are disclosed in U.S. Pat. No. 5,857,147, entitled "METHOD AND APPARATUS FOR DETERMINING THE TRANSMISSION DATA RATE IN A MULTI-USER COMMUNICATION SYSTEM," filed Dec. 20, 1995, and U.S. Pat. No. 6,285,655 entitled "METHOD AND APPARATUS FOR PROVIDING ORTHOGONAL SPOT BEAMS, SECTORS, AND PICOCELTS," filed Sep. 8, 1997, both assigned to the assignee of the present invention and incorporated by reference herein.

Fast Closed-Loop (FCL) Rate Control Adaptation

In an HDR system, an open-loop rate adaptation scheme uses a fast feedback channel to allow a transmission of a DRC message from an access terminal to an access point while the access point concurrently transmits a data packet to the access terminal on the forward data link. Hence, the access terminal can command the access point to either terminate or extend the current transmission in accordance with actual SINR conditions at the receiving access terminal. In an exemplary embodiment, the fast feedback channel is used to carry extra information as described below.

The forward link data rates in an HDR system vary from 38.4 kbps to 2.456 Mbps. The duration of each packet transmission in number of slots as well as other modulation parameters are described in Table 1. In this embodiment, a slot corresponds to a period of 1.666 ms, or equivalently, 2048 chips transmitted at the chip rate 1.2288 Mcps.

TABLE 1

Forward Link Modulation Parameters

| Data Rate number | Data Rate (kbps) | Number of Slots | Bits per Packet | Code Rate | Modulation |
|---|---|---|---|---|---|
| 1 | 38.4 | 16 | 1024 | ¼ | QPSK |
| 2 | 76.8 | 8 | 1024 | ¼ | QPSK |
| 3 | 102.4 | 6 | 1024 | ¼ | QPSK |
| 4 | 153.6 | 4 | 1024 | ¼ | QPSK |
| 5 | 204.8 | 3 | 1024 | ¼ | QPSK |
| 6 | 307.2 | 2 | 1024 | ¼ | QPSK |

TABLE 1-continued

Forward Link Modulation Parameters

| Data Rate number | Data Rate (kbps) | Number of Slots | Bits per Packet | Code Rate | Modulation |
|---|---|---|---|---|---|
| 7 | 614.4 | 1 | 1024 | ¼ | QPSK |
| 8 | 921.6 | 2 | 3072 | ⅜ | QPSK |
| 9 | 1228.8 | 1 | 2048 | ½ | QPSK |
| 10 | 1843.2 | 1 | 3072 | ½ | 8PSK |
| 11 | 2457.6 | 1 | 4096 | ½ | 16QAM |

In an exemplary embodiment, the structure of the multi-slot packets is modified to carry data in predetermined data slots, but not in predetermined gap slots. When the multi-slot packets are structured in accordance with the exemplary embodiment, the access terminal that is receiving the multi-slot packet can utilize the duration of the predetermined gap slots for other purposes. For example, the access terminal can use the time between the data slots to decide if the packet can be correctly decoded with the soft code symbols accumulated thus far. The access terminal can use various methods for determining whether the data slots have been correctly decoded, these methods including, but not limited to, checking the CRC bits associated with the data or estimating a predicted SINR based on received SINR of pilot and traffic symbols.

FIG. 1 is a diagram of an exemplary one-slot gap interlaced structure for multi-slot packets, wherein the predetermined data slots and the predetermined gap slots are interlaced in an alternating pattern. This embodiment will be referred to hereafter as a one-slot gap pattern. Multi-slot packet 100 is transmitted from an access point to an access terminal with data contained in alternating slots. For example, if the access terminal is transmitting in accordance with Data Rate 2 from Table 1, then there are 8 data slots in a multi-slot packet, and data would be carried in slots 1, 3, 5, 7, 9, 11, 13, and 15. Slots 2, 4, 6, 8, 10, 12, 14, and 16 would not be used to transmit portions of the multi-slot packet. A DRC message from the access terminal can be transmitted to the access point during time periods associated with the empty slots. In the above example, it should be clear that an access point can transmit another data packet to the same or different access terminal during the gap slots associated with the transmission of the 8-slot packet example.

In addition to DRC messages, this embodiment permits the transmission of indicator messages from the access terminal to the access point, which indicates a reception status of the access terminal, such indicator messages including, but not limited to STOP indicator messages or EXTEND indicator messages. It should be noted that the usage of indicator messages herein described for this embodiment are applicable for other embodiments that follow.

In an HDR system, code symbols that are transmitted in a packet at data rates of 307.2 kbps and below are repeats of the code symbols that are transmitted in a packet at 614.4 kbps. In general, most of the code symbols transmitted in a given slot are shifted repetitions of the code symbols transmitted in the first slot of the packet. The lower data rates require a lower SINR for a given low probability of packet error. Hence, if the access terminal determines that channel conditions are not favorable, the access terminal will transmit a DRC message requesting a data rate below 614.4 kbps. The access point will then transmit multi-slot packets in accordance with the structure described in FIG. 1. However, if the actual channel conditions improve so that the access terminal needs fewer repeated code symbols than originally specified by the open-loop rate adaptation algorithm, the structure described in FIG. 1 will allow the access terminal to transmit an indicator message, such as a STOP indicator message, on the reverse link feedback channel.

Figure 2:
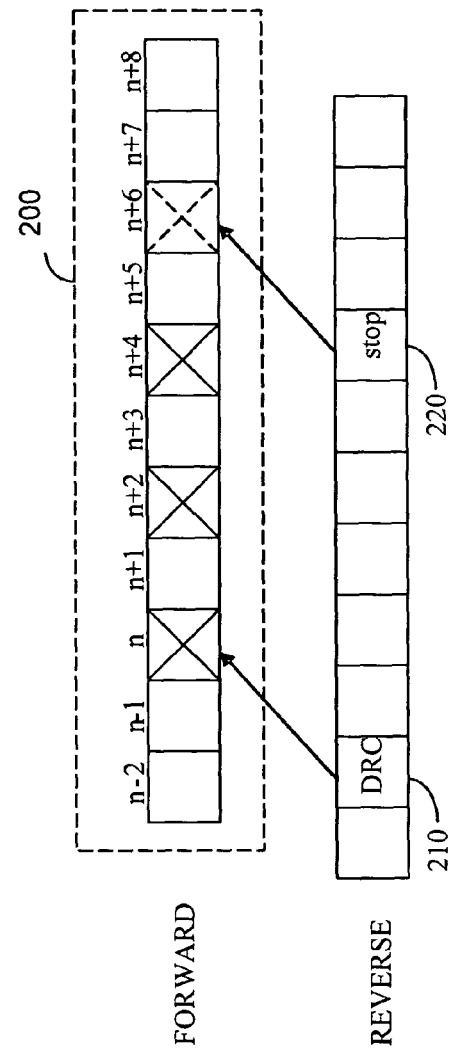
FIG. 2 is a diagram of an exemplary uniform N-slot gap interlaced structure for multi-slot packets.

FIG. 2 is a diagram that illustrates the use of a STOP indicator message. An access point transmits a data packet 200 in accordance with the interleaved structure of FIG. 1. Slots n, n+2, and n+4 are slots carrying data. A DRC message 210 is received during slot period n−1, so that data in slots n, n+2, n+4, and n+6 are scheduled for transmission in accordance with the requested data rate. A STOP indicator message 220 is transmitted by the access terminal because the access terminal has received enough repetitions of the code symbols in slots n, n+2, and n+4 to determine the complete data without receiving any more repetitions carried by n+6. Hence, the access terminal is ready to receive new data. STOP indicator message 220 is received by the access point during slot n+5. Upon receiving the STOP indicator message 220, the access point will cease transmitting repetitions in the remaining allocated data slot n+6 and begin the transmission of a new data packet in slot n+6. Unused allocated slots can be reassigned to another packet transmission directed toward any access terminal. In this manner, a closed loop rate adaptation can be performed to optimize resources when actual channel conditions allow for a higher data rate than the one specified in the original DRC message based on estimated channel conditions. In the example above, an effective data rate 4/3 times higher than the original requested data rate is achieved by sending the STOP indication.

Figure 3:
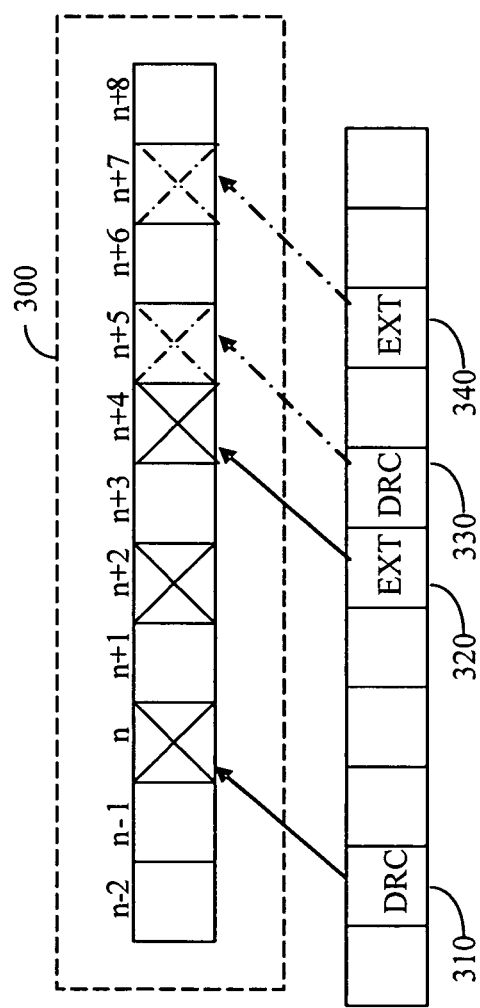
FIG. 3 is a diagram of an exemplary non-uniform N-slot gap interlaced structure for multi-slot packets.

In another aspect of this embodiment, an indicator message can be sent from the access terminal to the access point to enable more repetitions of the code symbols whenever the actual channel conditions are worse than the estimated channel conditions. The indicator message can be referred to as an EXTEND indicator message. Another use for an EXTEND indicator message arises when a one slot packet is incorrectly decoded by the access terminal. In this case, the access terminal may transmit an EXTEND indicator message requesting the retransmission of the data carried in a specified slot. The structure of FIG. 1 allows the access point to retransmit the data on the very next slot, referred to herein as an extended data slot, following the decoding of the EXTEND indicator message. FIG. 3 is an illustration of this use for an EXTEND indicator message. Data packet 300 is constructed in accordance with the structure of FIG. 1, so that alternating slots are designated gap slots. A DRC message 310 is received by the access point that provides the preferred rate for data transmitted in data slot n. Data is also transmitted in slot n+2 in accordance with the requested data rate. However, an EXTEND indicator message 320 is received by the access point that orders data repetition at data slot n+4 due to an error in decoding the data carried in slot n+2.

In another aspect of this embodiment, single-slot packets may be requested when the estimated SINR indicates a reduced probability of packet success, for example, a probability of packet success of 80-90%. Based on the received single-slot packet, the access terminal can send an EXTEND indicator to the access point, requesting retransmission of the packet, if the first single-slot packet has not been decoded correctly. This aspect of the embodiment has the advantage of an improved data throughput rate, which is achieved by the initial transmission of a high data rate. In accordance with this embodiment, the high data rate transmission can be adjusted according to actual channel conditions. FIG. 3 also illustrates this aspect of the invention. If the DRC message 310 carries a data request of 307.2 kbps, then data is transmitted in slots n and n+2 at the requested rate. However, if the access terminal detects an improvement in the channel conditions, the access terminal can send a DRC message 330 carrying a data request of 1.2 Mbps. The access point will then transmit a single-slot packet at 1.2 Mbps in slot n+5. During the time associated with the gap slot n+6, the access terminal detects a deterioration in the channel conditions, which necessitates the retransmission of the data in slot n+5. A EXTEND message 340 is transmitted and the access point retransmits the data from slot n+5 in slot n+7.

In one exemplary embodiment, the access terminal may be allowed to send up to $N_{EXT}(i)$ EXTEND indicator messages per packet, where i=1, 2, . . . , 11 corresponds to one of the Data Rates illustrated in Table 1.

The procedure described above for a closed loop rate adaptation is exemplary in transmissions where the data packet comprises one or two slots. It should be noted that the extended data slot carries code symbols that are repetitions of previously transmitted code symbols, and therefore, the code symbols in the extended data slots may be advantageously soft-combined with the previously received code symbols prior to the decoding step in order to improve reliability. The identification of which code symbols are to be transmitted in an extended data slot is an implementation detail and does not affect the scope of this invention.

The fast closed loop rate adaptation method described above can be implemented to rely on the same fast feedback channel used by the open loop rate adaptation scheme, but it should be noted that another separate channel may also be used to implement the closed loop rate adaptation method without altering the scope of the invention.

Another aspect of implementation is the formulation of the indicator messages. In an embodiment wherein only two indicator messages, the STOP indicator message and the EXTEND indicator message, are designated in the system, the system needs only use one bit to carry the indicator message. DRC messages carry multiple bits for rate selection and access point identification, but only one bit is needed to indicate a STOP indicator message or an EXTEND indicator message if the system discriminates the context of the bit upon usage. For example, an indicator bit may be designated as a FCL bit. If the access point detects the presence of the FCL bit from an access terminal in slot n, then the access point will interpret the FCL bit as a STOP indicator message if a data slot of a multi-slot packet directed to this access terminal is scheduled for transmission in slot n+1. However, the access point will interpret the FCL bit as an EXTEND indicator message if a packet scheduled to this access terminal and according to a requested data rate ended exactly in slot n−1. Alternatively, the access point can also interpret the FCL bit as an EXTEND indicator message if a previous EXTEND indicator message caused the retransmission of a slot of a specified packet exactly in slot n−1 and less than $N_{EXT}$ EXTEND indicator messages have been processed for this packet. If none of these situations are applicable, then the bit can be discarded as a false alarm.

In another embodiment, the indicator messages can be transmitted on the same feedback channel reserved for the open loop DRC messages by using one of the reserved DRC codewords. However, in this embodiment, the access terminal cannot simultaneously transmit a DRC message and an indicator message such as a STOP indicator message because only one message can be transmitted at a time. Hence, the access terminal will be prevented from being served another packet during the first slot released after the STOP indication was sent. However, other access terminals may be served in the first slot release. The efficiency of this embodiment is then maximized if the access point serves many access terminals since the probability that packets for a given access terminal would be contiguously scheduled is reduced.

In another embodiment, the indicator messages can be transmitted on a separate assigned channel, which can be created using extra Walsh functions on the reverse link. This approach has the extra advantage of allowing the access terminal to control the reliability of the FCL channel to a desirable level. In the embodiments described above, it should be observed that only one access terminal should be transmitting at any given time. Therefore, it is feasible to increase the power allocated to transmit the indicator message without affecting reverse link capacity.

As noted previously, the access point can maximize efficiency by transmitting data to other access terminals during the gap slots.

Figure 4:
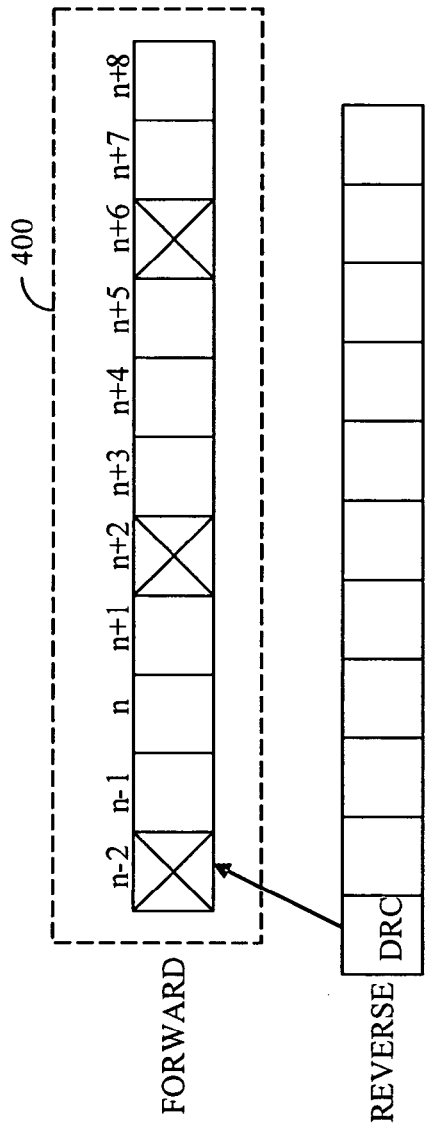
FIG. 4 is a diagram of an exemplary STOP control indication for a multi-slot packet.

FIG. 4 is a diagram of an exemplary interlaced structure for multi-slot packets, wherein the predetermined data slots and the predetermined gap slots are interlaced in a uniform N-slot pattern. This embodiment will be referred to hereafter as the uniform N-slot gap pattern. Multi-slot packet 400 is transmitted from an access point to an access terminal with the data contained in every $N^{th}$ slot. N−1 slots are gap slots, wherein the access terminal may use the delay associated with the gap slots to attempt decoding the data received in the previous data slot. As is well known in the art, blocks of data bits may be transmitted with coding to enable the recipient of the data to determine the existence of any errors in the data transmission. An example of such a coding technique is the generation of cyclic redundancy check (CRC) symbols. In one aspect of this embodiment, the delay caused by the uniform insertion of gaps enables the access terminal to decode CRC bits and to determine if the data slot was successfully decoded. Rather than sending indicator messages based on SINR estimation, the access terminal may send indicator messages based on the actual success or failure of decoding a data slot. It should be noted that the time needed to decode data is usually proportional to the number of information bits contained in the packet. Thus, as seen in Table 1, the higher data rate packets require more time for decoding. When determining an optimal value for N, the worst case delay must be taken into account when selecting the interlacing period.

In another aspect of this embodiment, the delay caused by the uniform insertion of gaps enables the access terminal to determine the estimated SINR during the reception of the data slots and transmit a DRC message advantageously.

In addition, extra slots of delay can be inserted in the multi-slot packet to enable the access terminal to transmit additional messages to the access point.

In a manner similar to the transmission of indicator messages for the one-slot gap pattern embodiment, STOP indicator messages and EXTEND indicator messages can be used in the uniform N-slot gap pattern. In addition, the formulation of the indicator messages can be accomplished using only one bit, if the system discriminates the context of the bit upon usage. For example, an indicator bit may be designated as a FCL bit. If the access point detects the presence of the FCL bit from an access terminal in slot n, then the access point will interpret the FCL bit as a STOP indicator message if a data slot of a multi-slot packet directed to this access terminal is scheduled for transmission in slot n+1. However, the access point will interpret the FCL bit as an EXTEND indicator message if a packet scheduled to this access terminal, according to a requested data rate, ended exactly in slot n−p+1, wherein p is the period of the assigned data slots to an access terminal. Alternatively, the access point can also interpret the FCL bit as an EXTEND indicator message if a previous EXTEND indicator message caused the retransmission of a slot of a specified packet exactly in slot n−p+1, and less than $N_{EXT}$ EXTEND indicator messages have been processed for this packet. If none of these situations are applicable, then the bit can be discarded as a false alarm.

Figure 5:
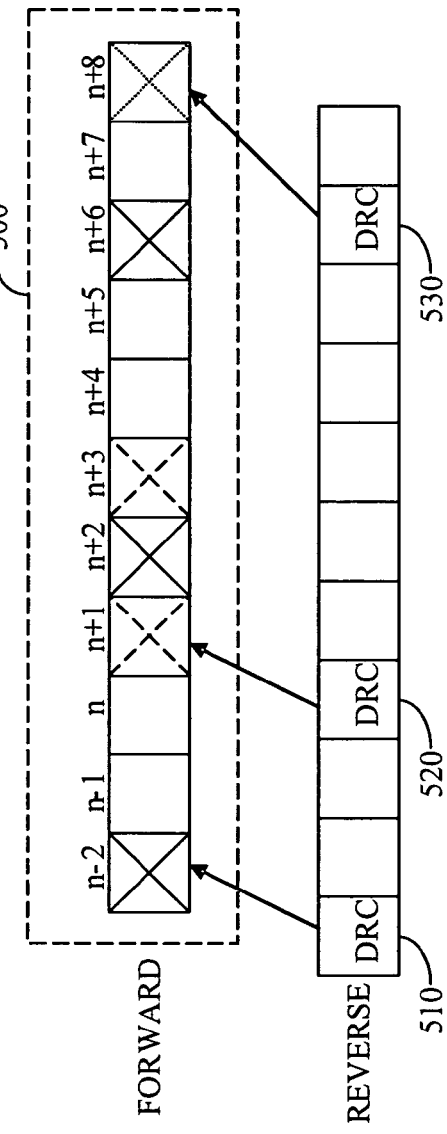
FIG. 5 is a diagram of an exemplary EXTEND control indication for a multi-slot packet.

FIG. 5 is a diagram of another exemplary interlaced structure for multi-slot packets, wherein the predetermined data slots and the predetermined gap slots are interlaced in a non-uniform slot pattern. This embodiment of the invention will be referred to hereafter as the non-uniform N-slot gap pattern. Multi-slot packet 500 is structured so that delays interlaced between data slots are a function of the data rate. The number of gap slots required between data slots of a packet at rate i, say N(i), is fixed and known by all access terminals and access point. Although this embodiment allows for the latency of each data rate packet to be minimized, there are a certain number of constraints that the access point must satisfy when scheduling the packets for transmission. One such constraint is the prevention of overlapping data slots.

As an example of the non-uniform slot pattern, the DRC messages of FIG. 5 can be used to transmit data in staggered patterns. In this example, DRC message 510 requests that data transmitted in slots n−2, n+2, and n+6 be transmitted at 204.8 kbps. DRC message 520 requests that data is transmitted in slots n+1 and n+3 at 921.6 kbps. DRC message 530 requests that data is transmitted in slot n+8 at 1.2 Mbps. Although the individual DRC messages are for periodic transmissions, the periodic transmissions are combined to create an aperiodic, non-uniform pattern. It should be noted that there is a constraint as to the data pattern initiated by DRC message 520. A two-slot data packet with a one slot gap in between the pair of data slots could have been scheduled to begin transmission at n+1 or n−1, but not at n. If the pattern had begun at n, then the current slot n+3 data would have been transmitted at slot n+2, which would have overlapped the data slot pattern scheduled with DRC message 510.

In a manner similar to the transmission of indicator messages for the one-slot gap pattern embodiment, STOP indicator messages and EXTEND indicator messages can be used in the non-uniform N-slot gap pattern. In addition, the formulation of the indicator messages can be accomplished using only one bit, if the system discriminates the context of the bit upon usage. For example, an indicator bit may be designated as a FCL bit. If the access point detects the presence of the FCL bit from an access terminal in slot n, then the access point will interpret the FCL bit as a STOP indicator message if a data slot of a multi-slot packet directed to this access terminal is scheduled for transmission in slot n+1. However, the access point will interpret the FCL bit as an EXTEND indicator message if a packet scheduled to this access terminal, according to a requested data rate, ended exactly in slot n−N(i), wherein N(i) is the number of gap slots required between data slots and i indicates a data rate index number. Alternatively, the access point can also interpret the FCL bit as an EXTEND indicator message if a previous EXTEND indicator message caused the retransmission of a slot of a specified packet exactly in slot n−N(i) and less than $N_{EXT}$ EXTEND indicator messages have been processed for this packet. If none of these situations are applicable, then the bit can be discarded as a false alarm.

Various advantages are achieved when using the uniform slot gap pattern over the non-uniform slot gap pattern and vice versa. A system using the uniform slot gap pattern could achieve maximum slot efficiency by staggering periodic patterns across all slots. For example, in a uniform pattern wherein slots n, n+4, n+8, . . . are assigned to one access terminal, a second access terminal can be assigned slots n+1, n+5, n+9, . . . , a third access terminal can be assigned slots n+2, n+6, n+10, . . . , and a fourth access terminal can be assigned slots n+3, n+7, n+11, . . . . In this manner, all slots are fully utilized to increase the efficiency of the network. However, in certain circumstances, it may be more desirable to implement a non-uniform slot gap pattern. For example, during high speed data transmissions, only one slot of data is transmitted with large amounts of code symbols. In such cases, the access terminal would require a relatively long duration to decode the received code symbols. Hence, the implementation of a uniform slot pattern would require correspondingly large periods with large amounts of gap slots, which would not be efficient. Under this circumstance, a non-uniform gap slot pattern may be preferable.

Figure 6:
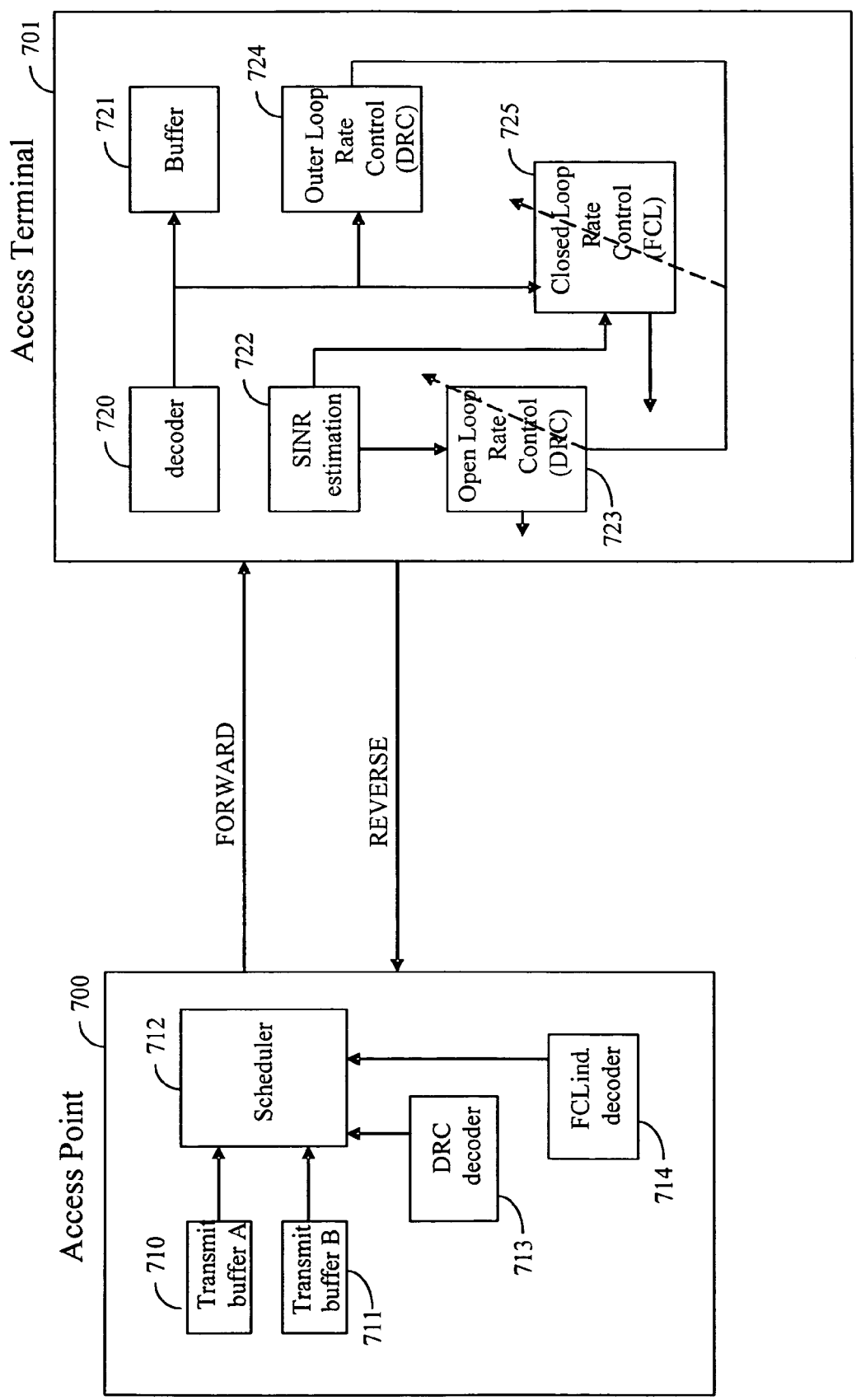
FIG. 6 is a block diagram of an exemplary embodiment of the invention.

FIG. 6 is a block diagram of an apparatus for performing FCL rate control in an HDR system. Access terminal 701 performs SINR estimation and prediction at SINR estimation element 722 based on the strength of the received forward link signal from access point 700. The results from SINR estimation element 722 are sent to open loop rate control element 723, which implements the open loop rate control algorithm in order to select a data rate in accordance with the results from SINR estimation element 722. The open loop rate control element 723 generates a DRC message to be sent over the reverse link to the access point 700. The DRC message is decoded at the DRC decoder 713 and the results are sent to the scheduler 712 so that the access point 700 can schedule data transmission at the specified requested rate in the slot following the decoding of the DRC message. It should be noted that the elements so far described are performing the open loop rate adaptation algorithm described above. The FCL rate control process is implemented by the scheduler 712 with the generation of interlaced packets as described above and the closed loop rate control element 725, which optionally allows the access terminal 701 to implement an FCL rate adaptation.

In FIG. 6, a one-slot gap pattern is implemented by scheduler 712 to serve two access terminals simultaneously. Thus, the access point 700 maintains two independent buffers, transmit buffer A 710 and transmit buffer B 711, in order to maintain the code symbols needed to generate a new slot repetition or slot extension. It should be noted that more transmit buffers may be utilized in accordance with the embodiments described herein.

Access point 700 transmits a data packet to access terminal 701. While receiving the data packet, the access terminal 701 may feed the results from the SINR estimation element 722 to the closed loop rate control element 725 or alternatively, the access terminal 701 may feed the results from the decoder 720 to the closed loop rate control element 725. Buffer 721 may be inserted to aid in the ordered delivery of decoded information from the decoder 720 to the upper layer protocols, which will not be described herein. The closed loop rate control element 725 can use results from either the decoder 720 or the SINR estimation element 722 to determine whether to generate an indication message. The indication message is transmitted on the reverse link to the access point 700, wherein an FCL indicator decoder 714 decodes the indicator message and feeds the decoded indicator message to the scheduler 712. The scheduler 712, DRC decoder 713, and the FCL indicator decoder 714 at access point 700 can be implemented as separate components or can be implemented using a single processor and memory. Likewise, the decoder 720, buffer 721, SINR estimation element 722, open loop rate control element 723, and the closed loop rate control element 725 at the access terminal 701 can be implemented as separate elements or can be combined on a single processor with memory.

Outer loop rate control element 724 may be inserted to compute long term error statistics. The results of such statistical computations can be used to determine a set of parameters that can be used adjust both the open loop rate control element 723 and the closed loop rate control element 725.

As discussed herein, the FCL rate adaptation method may decide to send an indicator message, such as a STOP indicator message or an EXTEND indicator message, to an access point. This method provides a fast correction mechanism to compensate for inaccuracies of the open loop rate control scheme. A multi-slot packet transmission can be stopped when there is sufficient information to decode the packet. Alternatively, a slot of an on-going multi-slot packet transmission can be repeated when successful decoding is not guaranteed.

The FCL rate adaptation method also improves the throughput rate by allowing the open loop rate control scheme to be aggressive in requesting one-slot packets at higher rates, since the FCL rate adaptation method allows for the transmission of an extended slot of data if a high rate packet cannot be decoded successfully. Throughput is also improved when the FCL rate adaptation method stops a multi-slot packet earlier than expected by the open loop rate control algorithm.

For example, an open loop rate control scheme can be designed so that the open loop rate control selects high rates using one-slot packets with a packet error rate (PER) of approximately 15% after the end of the first slot and a PER of at most 1% at the end of the extended slot. An extended slot would add at least 3 dB of average SINR in addition to any time diversity gain and puncturing loss reduction. For multi-slot packets, the open loop rate control algorithm can target a PER of 1% at the normal end of the packet. Hence, there would be a large probability of packet success with a reduced number of slots, which corresponds to a higher than expected rate. In addition, an extended slot would provide an extra margin for successful decoding if necessary, thus reducing the requirement of a delayed retransmission. It should be noted that SINR values for optimal efficiency will vary according to the various modulation techniques implemented in the network, so that the possible implementation of various SINR values as threshold values are not intended to limit the scope of the embodiments described herein.

In addition, the decision on whether to generate a STOP, EXTEND, or no FCL indication based upon SINR calculations should not be very aggressive, otherwise the probability of packet errors would be dominated by the probability that the closed loop rate control algorithm will erroneously assume that a packet can be correctly decoded.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for modifying an open-loop rate adaptation method to produce a hybrid open loop/closed loop rate structure, comprising:
   receiving a first slot of a first multi-slot packet;
   decoding the first slot of the first multi-slot packet; and
   terminating transmission of remaining slots of the first multi-slot packet if the decoding is successful:
   if decoding of the first multi-slot packet is not successful, the method further comprising:
   receiving a next slot of the first multi-slot packet;
   combining the first slot and the next slot of the first multi-slot packet to form a combination;
   decoding the combination; and
   terminating transmission of remaining slots of the first multi-slot packet if decoding of the combination is successful to produce an open-loop/closed loop rate adaptation that generates a time interleaved structure for slots in data pockets to allow an access terminal to transmit indicator messages to the access point during periods associated with gaps inserted in the interleaved structure.

2. The method as in claim 1, wherein decoding the first slot comprises: checking a cyclic redundancy code of the first slot.

3. The method as in claim 1, further comprising:
   transmitting, periodically, information indicative of a quality measure of the wireless channel,
   wherein terminating transmission of remaining slots of the first multi-slot packet if the decoding is successful further comprises transmitting a closed loop rate, control message.

4. The method as in claim 1, wherein if decoding is successful, the method further comprising:
   transmitting an indicator message indicating successful decoding.

5. The method as in claim 1, wherein combining the first slot and the next slot of the first multi-slot packet to form a combination further comprises:
   accumulating soft code symbols.

6. The method as in claim 5, wherein decoding the combination further comprises:
   generating soft code symbols for each received slot.

7. The method as in claim 1, wherein the first slot and the next slot of the multi-slot packet are received in non-contiguous time slots.

8. The method as in claim 1, wherein each slot of the first multi-slot packet is received in time slots contiguous to gap slots.

9. The method as in claim 1, further comprising:
   receiving a first slot of a second multi-slot packet in a time slot allocated to one of the remaining non-contiguous slots of the first multi-slot packet.

10. The method as in any of claim 5, or 6, wherein each slot of the first multi-slot packet is received at a predetermined time slot.

11. The method as in claim 1, wherein terminating comprises:
    transmitting an indicator message indicating successful reception.

12. The method as in claim 11, further comprising:
    receiving a first slot of a second multi-slot packet in a time slot allocated to one of the remaining slots of the first multi-slot packet.

13. The method as in any of claim 5, 6, 11, or 12, wherein the first multi-slot packet has a target packet error rate corresponding to a normal end of the first multi-slot packet, and wherein a packet error rate of the received first multi-slot packet is different from the target packet error rate.

14. The method as in claim 13, wherein the normal end of the first multi-slot packet corresponds to transmission of all slots of the multi-slot packet.

15. The method as any of claim 5, 6, 11, 12, or 14, wherein the first multi-slot packet has a target data rate corresponding to transmission of all slots of the first multi-slot packet, and wherein a data rate of the received first multi-slot packet is greater than the target data rate.

16. The method as in claim 15, wherein the terminating provides closed loop rate adaptation for multi-slot packet data rates.

17. The method as in claim 15, further comprising:
transmitting a data rate indicator, wherein the target data rate for the first multi-slot packet is a function of the data rate indicator.

18. The method as claim 1, wherein each slot of the first multi-slot packet is received at a predetermined time slot and wherein the predetermined time slots of the first multi-slot packet are interlaced with predetermined gap slots in an alternating pattern.

19. The method as in claim 18, wherein receiving slots of the multi-slot packet interlaced with the predetermined gap slots further comprises:
receiving the slots of the multi-slot packet in non-contiguous time slots.

20. The method as in claim 18, comprising:
decoding a slot of the multi-slot packet in a time slot corresponding to a predetermined gap slot, wherein the gap slot occurs after the predetermined time of the slot of the multi-slot packet.

21. The method as in claim 1, further comprising:
receiving all slots of the first multi-slot packet;
combining all slots of the first multi-slot packet to form a combination; decoding the combination;
transmitting a negative acknowledgment if decoding of the combination is not successful; and
transmitting an indicator message indicating successful reception if decoding of the combination is successful.

22. The method as in claim 21, wherein transmitting a negative acknowledgment further comprises:
sending an extend indicator,
wherein the method further comprises:
receiving retransmission of at least one of the slots of the first multi-slot packet in response to sending the extend indicator.

23. The method as in claim 1, wherein if decode is not successful, the method further comprising:
sending a negative acknowledgement (NAK); and
sending an extend indicator;
wherein the method further comprises:
receiving retransmission of at least one of the slots of the first multi-slot packet in response to sending the extend indicator.

24. A wireless apparatus for modifying an open-loop rate adaptation method to produce a hybrid open loop/closed loop rate structure, comprising:
means for receiving a first slot of a first multi-slot packet;
means for decoding the first slot of the first multi-slot packet; and
further comprising:
means for receiving a next slot of the first multi-slot packet if decoding of the first multi-slot packet is not successful;
means for combining the first slot and the next slot of the first multi-slot packet to form a combination;
means for decoding the combination; and
means for terminating transmission of remaining slots of the first multi-slot packet if decoding of the combination is successful to produce an open-loop/closed loop rate adaptation that generates a time interleaved structure for slots in data pockets to allow or access terminal to transmit indicator messages to the access point during periods associated with gaps inserted in the interleaved structure.

25. A wireless apparatus as in claim 24 wherein the first multi-slot packet has a target packet error rate corresponding to a normal end of the first multi-slot packet, and wherein a packet error rate of the received first multi-slot packet is different from the target packet error rate, and further comprising:
means for transmitting a data rate indicator, wherein the target data rate for the first multi-slot packet is a function of the of the data rate indicator.

26. The apparatus as in any of claim 24 wherein the apparatus is a computer program product that increases data rate and efficiency when coupled to a computing device.

27. A non-transitory computer readable media programmed provide a modified open-loop rate adaptation method to produce a hybrid open loop/closed loop rate adaption structure comprising:
code for causing a computer to receive a first slot of a first multi-slot packet; code for causing a computer to decode the first slot of the first multi-slot packet; and
said computer program product further comprising:
code for causing a computer to receive a next slot of the first multi-slot packet if the decode is not successful;
code for causing a computer to combine the first slot and the next slot of the first multi-slotpacket to form a combination;
code for causing a computer to decode the combination; and
code for causing a computer to terminate the remaining slots of the first multi-slot packet if decoding of the combination is successful to produce on open-loop/closed loop rate adaptation that generates a time interleaved structure for slots in data pockets to allow or access terminal to transmit indicator messages to the access point during periods associated with gaps inserted in the interleaved structure.

28. The non-transitory computer readable media of claim 27, further comprising:
code for causing a computer to periodically transmit information indicative of a quality measure of the wireless channel,
wherein terminating transmission of remaining slots of the first multi-slot packet further comprises transmitting a closed loop rate control message if the decoding is successful.

29. A non-transitory computer readable media programmed to perform a method for modifying an open-loop rate adaptation algorithm to produce a hybrid open loop/closed loop rate adaptation that generates a time interleaved structure for slots in data packets to allow an access terminal to transmit indicator messages to the access point during periods associated with gaps inserted in the interleaved structure, by executing: readable media of claim 27 further comprising:
code for causing a computer to receive all slots of the first multi-slot packet;
code for causing a computer to combine all slots of the first multi-slot packet to form a combination;
code for causing a computer to decode the combination;
code for causing a computer to transmit a negative acknowledgment if decoding of the combination is not successful; and
code for causing a computer to transmit an indicator message to indicate successful reception if decoding of the combination is successful.

30. A non-transitory computer readable media programmed to perform a method for modifying an open-loop rate adaptation algorithm to produce a hybrid open loop/ closed loop rate adaptation that generates a time interleaved structure for slots in data packets to allow an access terminal to transmit indicator messages to the access point during periods associated with gaps inserted in the interleaved structure, by executing:
- a first procedure for receiving a first slot of a first multi-slot packet;
- a second procedure for decoding the first slot of the first multi-slot packet; and
- a third procedure for terminating transmission of the remaining slots of the first multi-slot packet if the decoding is successful:,
- if decoding of the first multi-slot packet is not successful, the procedure further comprising:
- receiving a next slot of the first multi-slot packet;
- combining the first slot and the next slot of the first multi-slot packet to form a combination;
- decoding the combination; and
- terminating transmission of remaining slots of the first multi-slot packet if decoding of the combination is successful to produce an open-loop/closed loop rate adaptation that generates a time interleaved structure for slots in data pockets to allow an access terminal to transmit indicator messages to the access point during periods associated with gaps inserted in the interleaved structure.

* * * * *